W. E. LOWN.
NON-SKID ATTACHMENT FOR MOTOR VEHICLES.
APPLICATION FILED AUG. 16, 1915.
1,187,752.
Patented June 20, 1916.
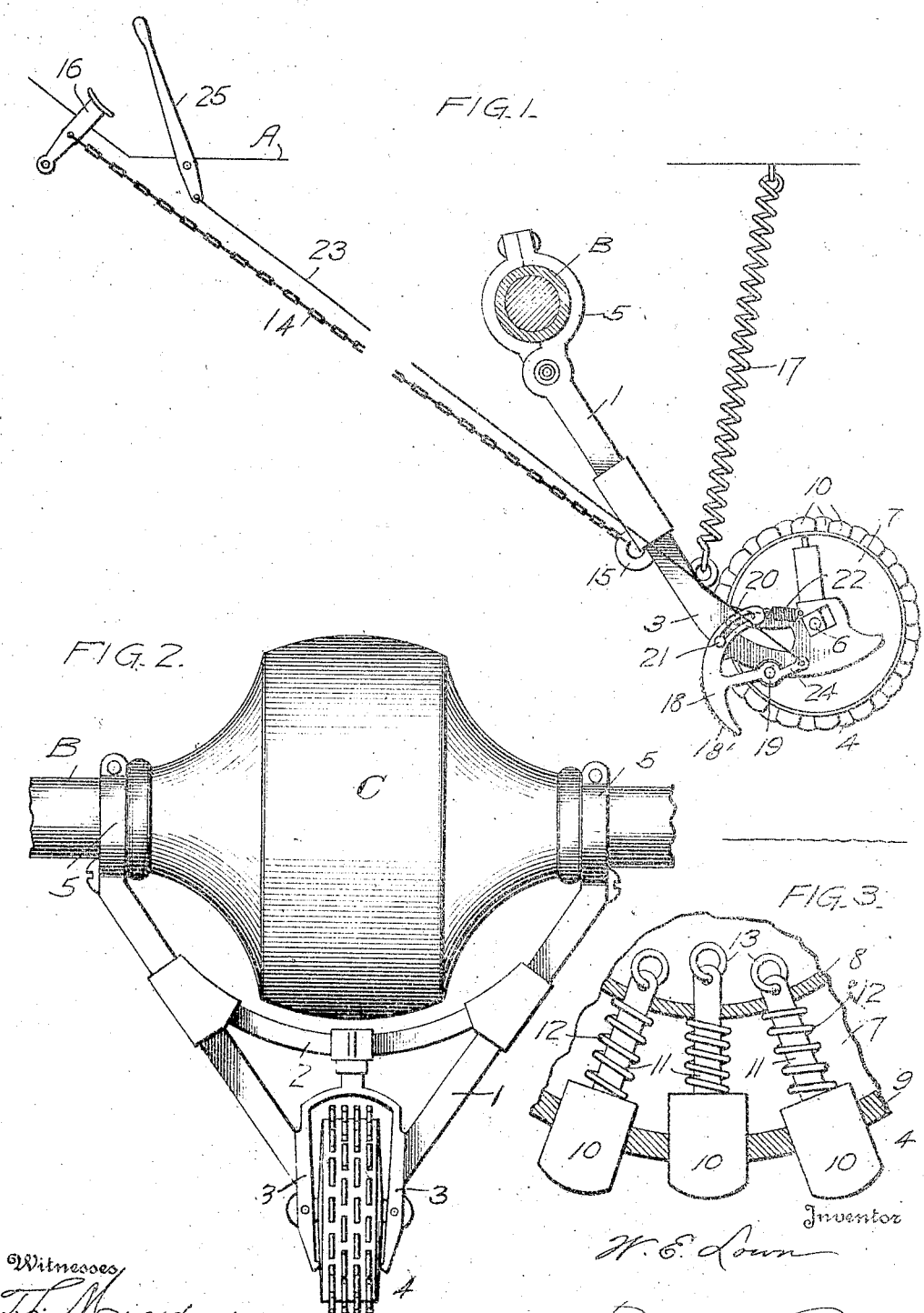

UNITED STATES PATENT OFFICE.

WILLIAM E. LOWN, OF NEW YORK, N. Y.

NON-SKID ATTACHMENT FOR MOTOR-VEHICLES.

1,187,752.   Specification of Letters Patent.   Patented June 20, 1916.

Application filed August 16, 1915. Serial No. 45,812.

*To all whom it may concern:*

Be it known that I, WILLIAM E. LOWN, a citizen of the United States, residing at New York, in the county of New York and State of New York, have invented certain new and useful Improvements in Non-Skid Attachments for Motor-Vehicles, of which the following is a specification.

This invention has relation to an attachment for motor vehicles intended to reduce to a minimum degree liability of skidding of such vehicles when operating under abnormal conditions such as upon slippery streets or road surfaces.

In the carrying out of the invention I contemplate the provision of an attachment device comprising a standard movably mounted upon the rear axle casing of the motor vehicle, preferably though not necessarily adjacent to the differential housing, said standard being equipped with a rotative traction device capable of being moved into and out of engagement with the surface over which the vehicle travels, there being also provided in association with the said traction device a peculiarly formed and mounted traction shoe designed primarily for use in checking the speed of the machine to which the attachment is applied and thereby to avoid liability of collisions that would ordinarily not be prevented by the operation of the traction device first mentioned, the function of which is primarily to prevent lateral skidding.

The invention also involves suitable operating mechanism for the several traction means above referred to, as well as other details of construction the action of which will be apparent upon review of the following description and in connection with the accompanying drawings, in which—

Figure 1 is a side view showing a motor vehicle equipped with the attachment of this invention. Fig. 2 is an enlarged rear view of the attachment showing its position on the axle housing adjacent to the differential casing. Fig. 3 is a detail fragmentary section bringing out clearly the mounting of the tread members of the rotative traction device.

Referring to the drawings, A denotes a motor vehicle of any conventional type having the rear axle casing B and the differential box or housing C.

Mounted upon the part B in such a manner as to depend therefrom is the standard 1 which is of a general V form, being preferably constructed from square tubing and supplied with the cross brace 2 connecting the sides thereof and also connected with a casting 3 in which the rotative device 4 is mounted. It will of course be obvious that the standard 1 may be of any substantial construction braced by suitable means and the same is pivotally supported on the casing B by means of clamps 5 receiving said casing at points upon opposite sides of the differential housing C.

In view of the foregoing arrangement and structure it is obvious that the attachment of this invention may be readily applied to machines at present in use as well as to machines coming direct from manufacturers.

The traction device 4 is rotative, as previously suggested, being mounted upon a shaft 6 supported in suitable bearings upon the casting 3. The device 4 comprises a wheel 7 composed of inner and outer rims 8 and 9 respectively, said rims being received between side plates secured to the rims 8 and 9 at opposite sides of the same.

Mounted upon the parts 8 and 9 are a plurality of tread members 10 formed with the stems 11 projecting through openings in the inner rim 8, the tread members 10 operating in a like manner through openings in the rim 9. Springs 12 are interposed between the members 10 and the rim 8 and normally tend to project the members 10 a slight distance from the periphery of the wheel 7, said periphery being established by the outer surface of the rim 9. For the purpose of preventing displacement of the tread members 10 from the wheel 7 it is contemplated to use the split rings 13 which pass through openings in the inner extremities of the members 11, said rings being adapted to abut with the inner surface of the rim 8 previously referred to, the latter forming a stop limiting the extent to which the tread members may be projected from the rim 9 under the action of the springs 12.

While any suitable number of rows of the tread members 10 may be provided annularly of the wheel 7, four of these rows will ordinarily be sufficient to give the required traction to the device 4 when used upon motor vehicles of the type known as roadsters and touring cars. However, the number of rows of the tread members 10 may be increased or decreased depending upon the size and weight of the vehicle to which the attachment may be applied, all within the purview of the invention.

A chain or other connector 14 is attached at one end to an eye 15 adjacent to the lower portion of the standard 1 and at its other end the connector 14 is secured to a pedal 16 or other manually operable device. A spring 17 is utilized to normally hold the standard 1 in a position in which the traction device 4 is upraised from the surface over which the vehicle equipped with the invention travels, said spring being secured to the standard at the lower end of the latter and to any convenient portion of the body of the motor vehicle.

In the use of the invention for preventing skidding of the vehicle to which it is applied it is obvious that at any time when liability of skidding is created during the driving of the vehicle, the operator may depress the pedal 16 and through the connector 14 the standard 1 will be pulled downward until the traction device 4 is in operative engagement with the road surface. Such engagement, owing to the contact of the relatively thin tread members 10, will provide sufficient traction under the pressure exerted on the pedal 16 and transmit it to the standard 1, to effectively avoid lateral skidding of the machine under all ordinary conditions.

It is well known that in the control of motor vehicles under abnormal conditions when traveling over slippery road surfaces the factor of the momentum or impetus of the vehicle being sufficient to cause considerable travel of the same notwithstanding the application of the brakes in an effort to stop, is one of importance and frequently involves considerable danger in relation to liability of collisions, etc. With a view to reducing this particular factor of danger to a minimum I contemplate the provision of means auxiliary to the traction device 4 and associated therewith for obtaining a braking tractive resistance effect intermediate the vehicle equipped with the attachment and the road surface. With this in view, as seen especially in Fig. 2, I contemplate employing the traction shoe 18 pivotally mounted at 19 on the lower portion of the casting 3. The shoe 18 has a roughened traction surface 18' at its lower portion and its upper portion is provided with a segmental guide member 20, the latter being provided with an arc-shaped slot receiving a guide pin 21 on the casting 3. A spring 22 normally holds the member 18 in a position upraised from the road surface, and above the lowermost operating portions of the tread members 10. A suitable connector 23 is attached to a lever arm 24 projecting from the shoe 18 and leads to a hand lever 25 located within the convenient reach of the operator of the vehicle. The spring 22 of course under ordinary conditions holds the shoe 18 out of action but in the event of possible skidding or sliding of the vehicle it is obvious that the operator may readily actuate either the hand lever 25 or the pedal 16 in order to correspondingly operate the shoe 18 and device 4 respectively, or either one of them as conditions require, and with resultant advantages in so far as control of the movement of the vehicle is concerned.

Having thus described the invention what is claimed is:

1. A non-skidding attachment for motor vehicles comprising a standard, a traction device mounted on said standard, and means for moving the standard to carry the traction device into and out of operative engagement with a road surface, said traction device comprising a rotative member and a plurality of bodily movable tread members yieldingly mounted upon said rotative member.

2. A non-skidding attachment for motor vehicles comprising a standard, a traction device mounted on said standard, means for moving the standard to carry the traction device into and out of operative engagement with a road surface, said traction device comprising a wheel composed of inner and outer rims, and a plurality of tread members yieldably mounted upon said rims.

3. A non-skidding attachment for motor vehicles comprising a standard, a traction device mounted on said standard, means for moving the standard to carry the traction device into and out of operative engagement with a road surface, said traction device comprising a wheel composed of inner and outer rims, a plurality of tread members mounted upon said rims each tread member comprising a stem passing through one of the rims aforesaid, and a spring bearing against the last mentioned rim and coöperating to yieldably hold the tread member in a projected position.

4. A non-skidding attachment for motor vehicles comprising a standard, a traction device mounted on said standard, means for moving the standard to carry the traction device into and out of operative engagement with a road surface, said traction device comprising a rotative member composed of inner and outer rims and side plates inclosing the space between said rims, tread members mounted upon the inner and outer rims and comprising stems passing through the inner rims, springs interposed between the tread members and the inner rims and yieldably holding the tread members in positions in which they are projected from the periphery of the outer rim, and means on the inner extremities of the stems aforesaid to prevent displacement of the tread members.

5. A non-skid attachment for motor vehicles comprising a standard, means for raising and lowering the standard, a traction device mounted on said standard and movable therewith into and out of engagement with the road surface, said traction device comprising a plurality of tread members adapted to prevent lateral skidding of a vehicle equipped with the attachment, and a traction shoe movably supported by said standard, and means to move the shoe into and out of engagement with the road surface.

6. A non-skidding attachment for motor vehicles comprising a supporting standard, a traction device mounted thereon and including a plurality of tread members engageable with a road surface to prevent lateral skidding of a vehicle equipped with the attachment, a traction shoe mounted on said standard for movement independently of that of the standard and also engageable with the road surface to create tractive resistance to prevent sliding of a vehicle equipped with the attachment, and means for operating the said traction device and traction shoe.

7. A non-skidding attachment for motor vehicles comprising a supporting standard, a traction device mounted thereon and including a plurality of tread members engageable with a road surface to prevent lateral skidding of a vehicle equipped with the attachment, a traction shoe mounted on said standard and also engageable with the road surface to create tractive resistance to prevent sliding of a vehicle equipped with the attachment, and means for operating the said traction device and traction shoe independently or simultaneously.

8. A non-skidding attachment for motor vehicles comprising a supporting standard, a traction device mounted thereon and including a plurality of tread members engageable with a road surface to prevent lateral skidding of a vehicle equipped with the attachment, a traction shoe mounted on said standard and also engageable with the road surface to create tractive resistance to prevent sliding of a vehicle equipped with the attachment, and means for operating the said traction device and traction shoe, the traction shoe comprising a guide member coöperative with the standard and a pivotal connection intermediate said shoe and the standard.

9. A non-skidding attachment for motor vehicles comprising a standard, a traction device carried by said standard and comprising a rotative member, tread members mounted upon said rotative member and adapted to engage a road surface, means for raising and lowering the standard and correspondingly moving the traction device in relation to the road surface, and auxiliary traction means carried by the standard comprising a shoe pivoted to the standard, a lever arm projecting from said shoe, means connected with the lever arm for throwing the shoe into operative engagement with a road surface, a guide member projecting from said shoe, guide means on the standard engaging said guide member, and a spring for normally holding the shoe in an inoperative position.

In testimony whereof I affix my signature.

WILLIAM E. LOWN.